United States Patent Office 3,433,561
Patented Mar. 18, 1969

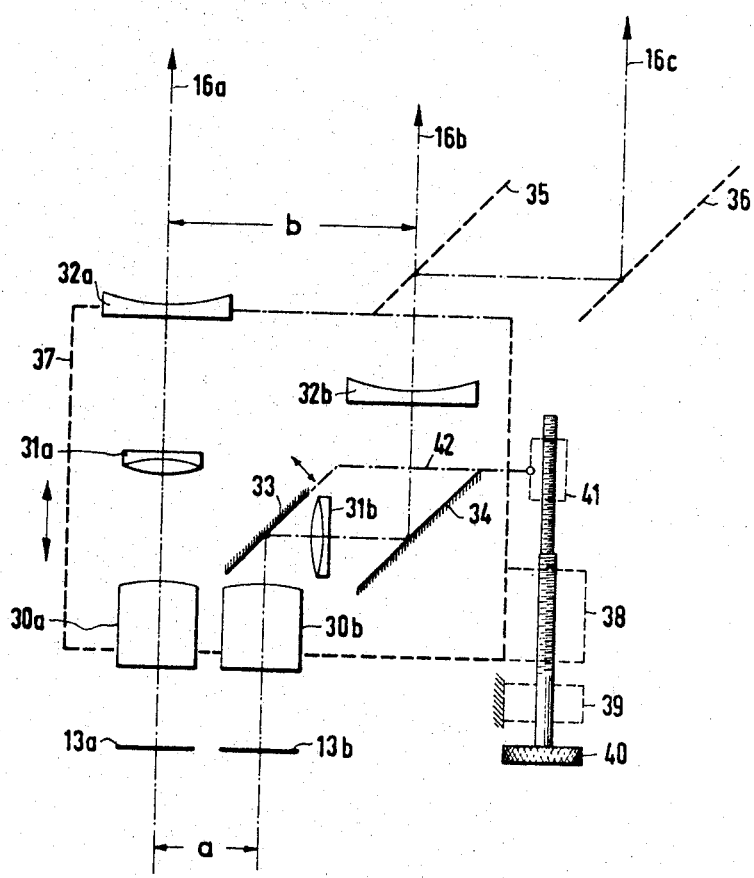

3,433,561
STEREO MOVING PICTURE CAMERA
Jan Louis Wulff Jacobsen, Copenhagen, Denmark, assignor to CCT Cinema Camera Technik AG, Zurich, Switzerland
Filed Oct. 11, 1966, Ser. No. 585,867
Claims priority, application Germany, Oct. 21, 1965, J 29,224
U.S. Cl. 352—60    5 Claims
Int. Cl. G03b 35/10

The present invention relates to moving picture cameras and is particularly concerned with a stereo moving picture camera for taking two pictures alongside one another on one film by means of two objectives arranged at a distance from one another corresponding to the center distance of the images and deflecting mirrors for increasing the photographing or shooting distance beyond the image center spacing approximately to the spacing between human eyes. This application is related to applicant's application filed simultaneously herewith and addressed to a stereo projector.

It is known to arrange two essentially parallel mirrors with each of two adjacent objectives of such a camera, which practically displace the optical axes of the two objectives from one another, so that the film images are photographed effectively with a distance therebetween which corresponds to the spacing of human eyes from one another. Only if this distance is maintained during shooting the pictures there is obtained a plastic impression or effect that corresponds to the actual conditions during the reproduction or projection. In addition it has also become known to use two individual cameras for shooting one film and then projecting two films synchronously. This does not give rise to any particular problem in the sense of making the image distance equal to the spacing between the eyes, although this problem arises with cameras of the initially mentioned type, because the image center distance on the film is predetermined by the film format and is essentially smaller than the spacing of the human eyes.

The invention concerns a camera of the initially mentioned type and consists essentially in that only one of the objectives has placed in front of it mirrors for increasing the image distance, while the other objective receives that pencil of light rays whose center axis coincides with its optical axis. By means of the arrangement in accordance with the invention the same advantages are obtained as with the known camera having mirrors placed ahead of each objective, while compared to the known camera, however, only one set of mirrors is required. This concept is of particular advantage as compared to the known arrangement, if one of the mirrors is rotatably disposed about a vertical axis in order to compensate for all photographing distances and for the image center distance on the film to remain the same. It should be noted that in this case only one mirror has to be adjusted, while in the known camera two mirrors must be adjusted. In addition it must be considered that with the known camera not only two mirrors must be adjusted by themselves, but that these two mirrors have to be adjusted angularly by the same amount to obtain exact synchronism.

In a suitable further development for exploiting this advantage the invention provides that one of the mirrors inserted ahead of the first objective is rotatable about a vertical axis and is positively coupled in that sense with the distance adjusting means of the objective, so that the image center distance on the film remains the same for all photographing distances. It is possible in a particularly simple manner in accordance with the invention to increase the distance on the objective side of the optical axis of the system by means of two further parallel mirrors.

In accordance with the invention it is not possible to avoid image size differences by inserting only one mirror system ahead of one of the objective lenses since the two image widths or sizes are not the same. Moreover, it has been discovered that this minor difference between the image widths and the different proportions as to sizes associated therewith of the pictures thus produced have no effect on the plastic viewing of the picture thus taken. Thus in accordance with the invention different image widths are intentionally disregarded for both pictures in order to simplify the means for the increase of the distance between the optical axes to the space between the human eyes.

The invention is of particular significance when anamorphotes are connected in series with both objectives in order to produce on one film two anamorphotically compressed images. Since thus it is possible in a simple manner to increase the spacing between the optical axes, it is not necessary to be too concerned about the relatively large radii of the structural components of such anamorphotes. Thus one can utilize larger anamorphotes having greater light intensity, while as far as the radii of the two individual anamorphotes are concerned, there are practically no limitations.

If anamorphotes having several components are utilized before each photographing objective, it is possible in order to achieve short structural length of the entire set of components to arrange one part of the components of the associated anamorphotes between two mirrors in front of the objective.

In the accompanying drawing an embodiment of the camera in accordance with the invention is illustrated schematically in plan view in vertical direction upon the optical system of the camera.

The two pictures 13a, 13b are indicated schematically in the film plane, which pictures are simultaneously photographed. The light which produces the image 13a first passes to the simple anamorphote consisting of two components 31a and 32a. This light then enters along the same optical axis into the known photograph objective 30a and thence onto the film surface. At a distance $a$ between the image centers the objective 30b is arranged alongside of the objective provided for producing the image 13a and which in its turn produces the image 13b at the distance of the correct image centers. The light producing this image enters along the optical axis 16b into the system at the right of the drawing and first passes through the anamorphotes consisting of the two elements 32b and 31b which optically is the equivalent of the anamorphote of the other system. In the path of the rays of the anamorphotes the light, however, is reflected with the aid of mirror 34 in the direction of the other system. After passing through the second cylinder lens 31b the light encounters a second mirror 34, which is essentially parallel to mirror 33, and thence after reflection enters the objective 30b along its optical axis, and upon passing therethrough produces the image 13b in a manner known per se. During photographing there occur parallel axis faults, which with the optical components mounted in the manner shown would result in that the image center distance *a* becomes as much larger as the depicted scene is closer. In order to avoid this the mirror 33 is movable about a vertical axis, as indicated by the small double arrow. The operating member for inclining the mirror 33 is rigidly coupled with the distance adjusting means of the objectives 30a and 30b. In this connection, of course, the arrangement is made in such a manner that with each adjustment for distance corresponding to each focal length, the image center distance *a* remains the same.

Thus it is accomplished by means of mirrors 33 and 34 that the image center distance *a* is enlarged to the normal spacing between human eyes of approximately 60 to 65 mm. The greater the distance of the optical axes 16a and 16b, the greater is also the plastic impression of the film shown. If for increasing the plastic impression or effect with scenes taken at great distances the spacing *b* is still to be increased, then it is possible, as indicated by the dashed lines at the upper edge of the drawing, to displace the axis on the objective side of the optical system from 16b to 16c by means of two further mirrors 35 and 36 so that the image spacing, i.e., the basic width, is increased.

The basic optics and the associated anamorphotes are in a common mounting or on a common panel such as a plate 37 which is movable in the direction of the optical axes 16a and 16b. The adjusting screw 40 has two threaded sections, one of which cooperates with the threads of nut 38 and the other with the threads of nut 41. The threaded member 38 is fixedly mounted on the housing or panel 37. The other threaded member 41 which is connected by means of a schematically indicated connection 42 with the mirror 33 serves for simultaneously moving the mirror. In this manner it is possible by means of a single adjusting screw to set the focal length of the optical system in that the entire plate 37 is moved along the optical axis, while simultaneously as the objective side comes closer, the optical axes 16a and 16b are inclined with respect to one another in that the mirror 33 is turned.

In the embodiment of the invention illustrated each of the two anamorphotes is an afocal laterally compressing anamorphote comprising a front negative or concave cylinder lens and a rear positive or convex cylinder lens. The two anamorphotic lens arrangements 31 and 32 together must have a refractive power of zero in diopters. The lenses 31a and 31b are positive composite lenses. Composition of the lenses of flint glass and crown glass serves for correcting color defects in a known manner.

In a camera tested in practice for taking stereoscopic movie films by means of two objectives arranged alongside one another, the new method is carried out in such a manner that the two partial images are imprinted on a common film alongside one another vertically with respect to the direction of film movement, whereby in the case of a negative of 65 mm. width the optical axes of the two identical basic optics are at a distance of 26 mm. from one another, so that two substantially square partial images are formed. In this connection the photographing is anamorphotic with horizontal compression at a compression factor 2 in a manner that before each of the two objectives a two part and identical anamorphote is arranged in the objective or housing space, whereby the path of the rays of one objective is displaced by two deflecting mirrors or by prisms to a greater base distance of, for example, 65 mm. This is done in such a manner that the positive partial component of the anamorphote of this basic optic is arranged between the mirrors with the axis displaced outwardly at a right angle while the negative partial component in the lens space is located before the second mirror. Furthermore, a lens element is arranged before the partial component on the object side of this anamorphote which is constituted of a plano-convex and a plano-concave cylindrical lens of equal reflecting power, the cylindrical lenses of which are placed one in front of the other in such a manner that they can be moved relative to one another along their cylindrical surfaces and thereby effect a convergence on the prism effect during focusing on objects that are located closer than infinite. The reflecting mirror that is closer to the main lens is pivotally mounted and coupled by adjustable levers with the fousing means in such a manner that on adjusting for closer objects the setting angle of the mirror adjusted to 45° with respect to the plane of the film for infinity is reduced to such an extent in order to obtain convergence that the points of image on the film that correspond to one another will remain at a constant distance from one another. The focusing of the system is effected in that the two basic optics or lenses and the two negative front components of the anamorphotes are each mounted on a panel and are both adjusted in common with respect to the film plane and for counter movement by worms or equivalent adjusting means to different lens distances, whereby also the pivotable deflecting mirror or prism is mechanically coupled to this adjusting means.

In accordance with a further embodiment of the invention all optical components can be fixedly mounted and adjusted to infinitive lens setting. Then the focusing and the convergence are effected by a spherical two-part collimator acting simultaneously on both lenses, which is disposed ahead of the two anamorphotic front elements in the center parallel axis of both anamorphotes and variable by an adjustable air gap distance. Due to the fact that the optical axes of the anamorphotes are located to the right and to the left alongside the optical axis of the collimator there results by increasing the air gap in the collimator, or when its negative front part is moved forwardly, a convergence of the two objective axes and simultaneously common focusing.

Having now described my invention with reference to the embodiment illustrated in the drawing, I do not wish to be limited thereto, but what I desire to protect by Letters Patent of the United States is set forth in the appended claims.

I claim:

1. Optical system for a stereo moving picture camera for simultaneously taking two pictures by means of two objectives on a film at a predetermined center to center image distance from one another, said system comprising two objectives arranged with their optical axes at a distance from one another corresponding generally to said image distance on the film and deflecting mirror means for increasing the spacing between the optical axes for taking pictures to a distance corresponding generally to the spacing between the human eyes, said mirror means for increasing the spacing between the optical axes being associated with only one of said objectives and comprising a pair of deflecting mirrors, while said other objective has its optical axis coinciding with the axis of light rays entering from the object photographed.

2. Optical system for camera in accordance with claim 1, including means for adjusting the focal length of the objectives and where one said deflecting mirror ahead of said one objective is mounted for movement about a vertical axis under control of said adjusting means in a manner that the center to center image distance remains the same for all distances of the photographed objects.

3. Optical system for camera in accordance with claim 2, including a pair of additional parallel deflecting mirrors for further increasing the spacing between the optical axes for the taking of pictures.

4. Optical system for camera in accordance with claim 2, including anamorphotes disposed along the trace of light rays ahead of each objective.

5. Optical system for camera in accordance with claim 4, where at least one member of the anamorphote associated with said one objective is disposed intermediate said pair of deflecting mirrors.

References Cited

UNITED STATES PATENTS 1,878,382  9/1932  Crosier _____ 352—62
3,045,542  7/1962  Finkelstein _____ 352—69 X

FOREIGN PATENTS 527,256  7/1921  France.
740,927  11/1955  Great Britain.

JULIA E. COINER, *Primary Examiner.*

U.S. Cl. X.R.

352—44, 86